United States Patent
Higgins et al.

[15] 3,654,005
[45] Apr. 4, 1972

[54] BONDING GLASS WITH THERMOPLASTIC SEALING COMPOSITIONS

[72] Inventors: John J. Higgins, Westfield; Anthony J. Berejka, Cranford; Lawrence Spenadel, Westfield, all of N.J.

[73] Assignee: Esso Research and Engineering Company

[22] Filed: July 19, 1968

[21] Appl. No.: 745,997

[52] U.S. Cl. ............................156/108, 52/746, 156/275, 156/293, 156/333, 156/334, 156/335, 161/198, 161/202, 161/203, 260/27 R, 260/41 A, 260/41 B, 260/844, 260/847, 260/878 R, 260/884, 296/93
[51] Int. Cl. ........................................C09j 3/14, B29c 27/06
[58] Field of Search..................260/27, 38, 41, 844, 847; 196/108, 293, 333, 335; 156/334, 275

[56] References Cited

UNITED STATES PATENTS

| | | | |
|---|---|---|---|
| 2,715,598 | 8/1955 | Rees et al. | 156/309 X |
| 2,733,789 | 2/1956 | Tolle | 156/293 X |
| 3,294,866 | 12/1966 | Soldatos | 260/845 |
| 3,298,985 | 1/1967 | Bills et al. | 260/29.3 |
| 3,354,107 | 11/1967 | Hamed | 260/31.2 |
| 3,400,090 | 9/1968 | Maslow | 260/23.7 |
| 3,468,738 | 9/1969 | Deisenroth | 156/293 |
| 3,470,145 | 9/1969 | Lipman | 260/897 |
| 3,484,335 | 12/1969 | Wismer et al. | 161/160 |
| 3,527,663 | 9/1970 | Rose et al. | 156/275 X |
| 3,542,619 | 11/1970 | McManus | 156/275 |

Primary Examiner—Carl D. Quarforth
Assistant Examiner—E. A. Miller
Attorney—Chasan and Sinnock and Jack Matalon

[57] ABSTRACT

A process of sealing window glass including preparing a thermoplastic sealing tape of either a) butyl rubber or halogenated butyl rubber with a thermoplastic material and a tackifier, or b) EPDM or EPM rubber with a tackifier, inserting the tape in a window frame, heating the tape to soften it, and inserting the window glass.

47 Claims, 1 Drawing Figure

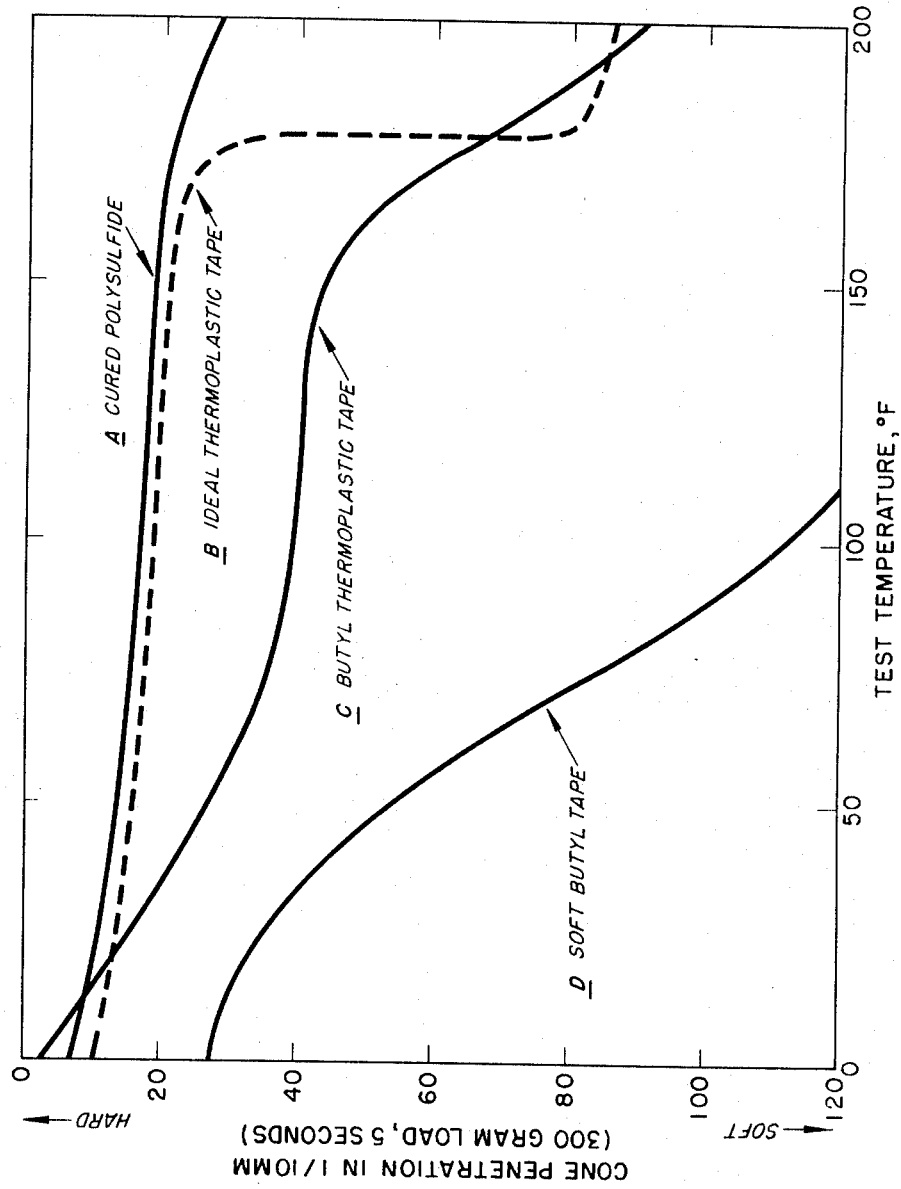

BONDING GLASS WITH THERMOPLASTIC SEALING COMPOSITIONS

BACKGROUND OF INVENTION

It has long been known to use elastomeric bases as sealants in glazing, e.g. the sealing of automobile windshields. These sealants have taken various forms. Gunnable mixtures, that is flowable mixtures which could be applied by the use of a hand gun, have long been used. These products have the disadvantage that it is difficult to control the amount of sealant placed in the cavity to be sealed. To achieve any strength or rigidity, these gunnable sealants must frequently rely on some type of chemical cure. As a result, these sealants often are complicated multi-component sealants which have sensitive cure rates and limited shelf stability.

Novel sealants in the form of tapes have become prevalent in the automotive industry and in window glazing in general, primarily because of the quality control and economics which can be achieved in using a measured quantity of sealant, i.e. in the tape form. These tape sealants do not require curing and have excellent shelf-stability. Tape sealants have taken various forms, for example, soft butyl compositions which are uncured and deformable at room temperatures; partially cured compositions which are still deformable for ease of installation, but which are stronger and more flow resistant, (see for example U.S. Pat. No. 3,288,667, incorporated herein by reference which discloses various partially cured compositions based on butyl rubber and polybutenes). Where high rigidity is desired, the curable, gunnable polysulfide type compositions have been found to be particularly useful, since they are especially strong and rigid and do not easily deform at normal use temperatures, i.e. 90° F. to 140° F. It would be advantageous to have a tape sealant which combines the ease of application of the soft butyl tape and the high rigidity of polysulfide gunnable sealant.

An ideal type of sealant composition is one which can be heated at reasonable temperatures, i.e. about 175° F. and deformed for the purpose of installation, but which, at the same time, will have sufficient rigidity at room temperatures to give structural strength to the glass-metal system being sealed. Ideally, the product would have a sharp melting point, see for example, the drawing, Curve B. This sharp melting point will be desired since a wide range of operating temperatures is necessary, for example, hot summer days may achieve temperatures of 100° or higher, with portions of the body of the automobile reaching temperatures as high as 140° F. Therefore, sealing compositions similar to many of those commercially used, which soften gradually throughout a wide range of temperature, are undesirable for rigid glazing systems. Typical of such compositions is soft butyl tape shown as Curve D in the drawing.

SUMMARY OF INVENTION

It has surprisingly been found that by compounding butyl rubber with a thermoplastic resin, it is possible to form a sealing composition which has relatively good stability at temperatures as high as 150° and yet will soften to a workable level above this temperature.

The thermoplastic materials of this invention may be polyterpene-phenolic resins, thermoplastic non-reactive phenol formaldehyde resins, petroleum hydrocarbon resins, alkyl phenol formaldehyde type resins and polyterpene resins. Certain polymers such as polyethylene, polypropylene and particular ethylene-propylene terpolymers which have thermoplastic properties may also be used as the thermoplastic resin of this invention.

BRIEF DESCRIPTION OF DRAWING

The drawing shows the hardness of sealant at various temperatures.

DETAILED DESCRIPTION

The thermoplastic sealing tapes of this invention preferably have high rigidity or hardness at temperatures up to about 140° F. and a relatively high degree of softness at temperatures in excess of 150°, preferably 175° F. These compositions should have a cone penetration at room temperatures, i.e. about 72°F., of about 10 to about 60, more preferably 25 to about 40, e.g. 30, and a cone penetration at 175° of about 55 to about 110, more preferably 65 to about 95, e.g. 80.

The cone penetration test referred to herein is the standard ASTM method D-5 with an asphalt cone having a total moving load of 300 grams. Readings in 1/10 millimeter are taken after 5 seconds penetration.

To achieve the desired rigidity and maintain the elastomeric properties of a sealant, the compounding requirements for thermoplastic tapes of this invention center about 4 compounding materials: an elastomer base, thermoplastic materials, a tackifier and fillers. The fillers, though not essential, are desirable for economic reasons. Additionally, the use of fillers improves extrusion properties of these compositions. As is shown below, where the thermoplastic material is a thermoplastic resin, the use of an additional tackifier is optional since the thermoplastic resins are effective tackifiers. Since it is highly desirable for sealants to have outstanding aging and weather properties, the elastomer base should be known for its ability to withstand degradation. As a result, butyl rubber and chlorinated butyl rubber which have essentially saturated backbones with very limited unsaturation make an ideal base for thermoplastic tape sealants.

The sealant should exhibit adhesive properties so as to form a good seal. Adhesiveness is measured by the button adhesion test. Button adhesion was run similar to ASTM D-429 using aluminum buttons with a one-square inch surface area which were pulled at 2 inches per minute from a glass plate.

The expression "butyl rubber" as employed in the specification and claims is intended to include copolymers made from a polymerization reaction mixture having therein from 70 to 99.5% by weight of an isoolefin which has about four to seven carbon atoms, e.g. isobutylene and about 30 to 0.5% by weight of a conjugated multiolefin having from about four to 14 carbon atoms, e.g. isoprene. The resulting copolymer contains 85 to 99.5% by weight of combined isoolefin and 0.5 to 15% of combined multiolefin.

Butyl rubber generally has a viscosity average molecular weight of about 30,000 to about 500,000, preferably about 50,000 to about 450,000, especially about 100,000 to about 375,000; and a Wijs Iodine No. of about 0.5 to 50, preferably 1 to 15. The preparation of butyl rubber is described in U.S. Pat. No. 2,356,128 which is incorporated herein by reference. Illustrative of butyl rubbers suitable for use in this invention is Butyl 035, a polymer having a Mooney viscosity of 45 at 212° F. and 0.8 mole % unsaturation (Enjay Chemical Company).

Halogenated butyl rubber is commercially available and may be prepared by halogenating butyl rubber in a solution containing between 1 to 60% by weight of butyl rubber in a substantially inert $C_5$-$C_8$ hydrocarbon solvent such as pentane, hexane, heptane, etc. and contacting this butyl rubber cement with a halogen gas for a period of about 25 minutes whereby halogenated butyl rubber and a hydrogen halide are formed, the copolymer containing up to one halogen atom per double bond in the copolymer. The preparation of halogenated butyl rubber is old in the art, see e.g. U.S. Pat. 3,099,644, which is incorporated herein by reference. This invention is not intended to be limited in any way by the manner in which butyl rubber is halogenated and both chlorinated and brominated butyl rubber are suitable for use in this invention. Illustrative of halogenated butyl rubbers is Enjay Butyl HT 1066 (a chlorinated butyl rubber having 1.5 mole % unsaturation, 1.1-1.3 wt. % chlorine, and a viscosity average molecular weight of about 350,000).

In order to produce halogenated butyl rubber, the halogenation is regulated so that the resulting rubber will contain about at least 0.5 wt. % (preferably at least about 1.0 wt. %) combined halogen, but not more than about "X" wt. % combined chlorine or 3.0 "X" wt. % combined bromine wherein:

$$X = \frac{M_3 L}{(100-L)M_1 + L(M_2 + M_3)} \times 100$$

and:

L = mole % of multiolefin in the polymer,
$M_1$ = molecular weight of the isoolefin,
$M_2$ = molecular weight of the multiolefin,
$M_3$ = atomic weight of chlorine or bromine.

Suitable halogenating agents which may be employed are gaseous chlorine, liquid bromine, alkali metal hypochlorites or hydrobromites, $C_4$–$C_{10}$ tertiary alkyl hypochlorites, sulfur bromides, sulfuryl chlorides, pyridinium chloride per chloride, N-bromosuccinimide, alpha-chloro-acetanilide, N,N'-dichloro-5,5-dimethyl hydantoin, iodine halides and trichlorophenolchlorides. Preferred halogenating agents are liquid chlorohydantoins, bromohydantoins, iodine monochloride and related materials. The halogenation is generally conducted at temperatures above 0° to about +100° C., depending upon the particular halogenating agent, for about 1 minute to several hours. The halogenation may be accomplished by preparing a 1 to 30 wt. % solution of such polymers as above in a substantially inert liquid organic solvent such as $C_3$–$C_8$ substantially inert hydrocarbons or halogenated derivatives of saturated hydrocarbons, e.g. hexane, mineral spirits, cyclohexane, benzene, chlorobenzene, chloroform, carbon tetrachloride, mixtures thereof, etc. and adding thereto the halogenating agent which may optionally be dissolved in a substantially inert $C_3$–$C_{12}$ hydrocarbon, a $C_1$–$C_5$ alkyl chloride, carbon tetrachloride, carbon disulfide, etc. If chlorine gas is employed, it may also be diluted with up to about 50, preferably 0.1 to 5, times its volume of a substantially inert gas such as nitrogen, methane, carbon dioxide, etc.

The term "EPDM" is used in the sense of its definition as found in ASTM D–1418–64 and is intended to mean a terpolymer containing ethylene and propylene in the backbone and a diene in the side chain. Illustrative methods for producing these terpolymers are found in U.S. Pat. No. 3,280,082, British Pat. No. 1,030,989 and French Pat. No. 1,386,600, which are incorporated herein by reference.

The preferred polymers contain about 45 to about 80 wt. % ethylene and about 2.0 to about 10 wt. % of a diene monomer, the balance of the polymer being propylene. Preferably, the polymer contains about 55 to about 80 wt. % ethylene, e.g. 70 wt. % and about 2.0 to about 4.0 wt. % diene monomer, e.g. 3.0 wt. %.

The diene monomer is preferably a nonconjugated diene. Illustrative of these nonconjugated diene monomers which may be used in the terpolymer (EPDM) are hexadiene, dicyclopentadiene, ethylidene norbornene, methylene norbornene, propylidene norbornene and methyl tetrahydroindene. A typical EPDM is Vistalon 4504 (Enjay Chemical Co.) a polymer having a Mooney viscosity at 212° F. of about 40 prepared from a monomer blend having an ethylene content of about 56% and a nonconjugated diene content of about 3.3 wt. %. Typical EPDMs are Vistalon 4504, a polymer having a Mooney viscosity of about 40 at 212°F. and an ethylene content of about 55 wt. % and about 3.3 wt. % and Vistalon 3708 having a Mooney viscosity of 50 at 260° F., about 75 wt. % ethylene and about 3.0 wt. % diene monomer (Enjay Chemical Company).

The term "EPM" as used in the specification and claims is intended to mean saturated copolymers of ethylene and propylene. The preferred EPM polymers contain about 40 to about 90 wt. % ethylene, the remainder being propylene. Illustrative of such EPMs are Vistalon 404, an EPM having a Mooney viscosity of 40 at 212° F. and an ethylene content of 40 wt. % and Vistalon 909X, an EPM having a Mooney viscosity of 37 at 260° F. and an ethylene content of 90 wt. % (Enjay Chemical Company).

The preferred EPDM and EPM suitable for use as thermoplastic materials in the practice of this invention have a Mooney viscosity at 212° F. of about 30 to about 110; more preferably, about 35 to about 90; most preferably, 40 to about 70.

Thermoplastic materials used in these compositions serve two purposes. First, to give the composition a relatively sharp melting point and second, to act as an adhesion promoter. In general, the thermoplastic materials are preferably of a resinous nature with a softening range above 175° F. To promote adhesion, these resins preferably have some polarity or are derived from an aromatic base. If desired, additional tackifiers may be used to improve the tack of the composition.

The thermoplastic resins suitable for use in this invention include phenol formaldehyde resins, alkyl phenol-formaldehyde resins, para-coumarone-indene resins, petroleum hydrocarbon resins, polymers of petroleum hydrocarbon alkyl aromatic resins, terpene-phenol resins and modified wood rosins.

Illustrative examples of these types of resins are Durez 12686, a phenol-formaldehyde resin having a softening range of 158°–167° F. (Hooker Chemical Co.); Catalin 8318, an alkyl phenol Novolak resin having a softening range of 194° F. to 230° F.; Schenectady SP–553, a terepene-phenol resin having a softening range of 170°–190° F. (Schenectady Chemical Co.); Piccopale 100, a petroleum hydrocarbon resin of aliphatic olefins having a softening range of about 200° F.; Picco Resin 110, a hydrocarbon alkyl aromatic resin having a softening range of about 230° F. and Pentalyn H, a pentaerythritol ester of hydrogenated rosin having a softening range of about 105° C.

The term "thermoplastic resin" as used in the specification and claims is intended to mean the thermoplastic materials of the type described above. These resins have tackifier properties, though additional tackifiers may be used in conjunction with these resins.

In addition to the above resins, various polymers are suitable for use in this invention. For example, various polyethylenes, polypropylene resins and EPMs, such as AC polyethylene 617, a low density low molecular weight polyethylene having a density of about 0.92 and a melting point of about 215° F. (Allied Chemical Co.); Grace Film Resin, a low density polyethylene resin having a density of about 0.923 and a melt index of 2.0 (W. R. Grace & Co.); Escon 115 (Enjay Chemical Company) a polypropylene having a specific gravity of 0.915 and a melt flow rate of 4.9 to 6.1 and Vistalon 909X described above. The preferred thermoplastic materials have softening or melting points of about 150° F. to about 250° F., preferably 160°–230° F., more preferably about 160°F. to about 200°F.

The term "thermoplastic material" as used in the specification and claims includes thermoplastic resins of the type described and polymers such as polyethylene, polypropylene, EPDM and EPM. The thermoplastic material should have a Ring and Ball softening point (ASTM E–28) of at least 100° F. Preferably, these materials have a softening point between about 100° F. to about 300° F.; more preferably, about 110° F. to about 250° F., most preferably, about 140° F. to about 230° F.

The thermoplastic materials may be incorporated into the thermoplastic sealing composition in about 25 to about 150 parts per hundred based on the rubber, more preferably, 25 to 100 parts per hundred, most preferably, about 40–80 parts per hundred. Ideally, about 45–65, e.g. 50 parts per hundred of said resins are used.

The term "softening point" or "softening range" as used in the specification and claims is intended to mean the Ring & Ball softening point as determined by test method ASTM E–28.

Tackifiers which may be used in the practice of this invention include thermoplastic, non-reactive phenol resins such as Amberol 137X (Rohm & Haas), a non-reactive phenol formaldehyde resin believed to be the reaction product of one mole of p-octylphenol, 2 moles of formaldehyde and one mole of sodium hydroxide, the reaction being carried out such that the condensation product contains no reactive methylol groups; pentaerythritol ester of hydrogenated rosin such as Pentalyn H (Hercules Powder Co.), a wood rosin derivative having a softening range of about 105° C.; polyterpene resins such as Piccolyte S-125, a polyterpene resin having a softening point of about 125° C. and Piccolyte S-10, a polyterpene having a melting point of about 10° C.; polyisobutylene polymers having a Staudinger molecular weight of about 6,000 to about 15,000, preferably 8,000 to 12,000, e.g. LM-MS Vistanex (Enjay Chemical Company), a polyisobutylene having a Staudinger molecular weight of about 10,000; polybutene resins having an SSU viscosity at 100° F. of about 100 to about 800,000 and an SSU viscosity at 210° F. of about 39 to about 25,000, e.g. Indopol H-1900, a polybutene having a Mechrolab Osmometer molecular weight of about 2500, an SSU viscosity at 100°F. of about 788,000 and a viscosity of 20,000 at 210° F., Indopol L-10, a polybutene having a Mechrolab Osmometer molecular weight of about 313, an SSU viscosity at 210° F. of 39 and a viscosity at 100° F. of about 107.

Fillers which may be used in the practice of this invention include hydrated silica such as Hi-Sil and Cab-O-Sil M, mineral fillers such as a ground calcium carbonate (Atomite Whiting), natural coated oyster shell calcium carbonate (Laminar), hydrated aluminum oxide (Snobrite Clay), and ultra-fine magnesium silicate (Mistron Vapor Talc). Ultra-fine magnesium silicate and hydrated silica (Hi-Sil 233) are especially advantageous. These reinforcing mineral fillers may be used at about 30 to about 150 p.h.r., based on the rubber, more preferably 40 to about 120, most preferably about 60 to about 100, e.g. 75. Any suitable type carbon black may be used. Typical of such blacks are Fast Extruding Furnace (FEF) blacks and low structure HAF blacks. These blacks may be used at about 30 to about 150 p.h.r., based on the rubber, more preferably, about 40 to about 120 p.h.r., most preferably about 60 to about 100, e.g. 75.

The advantages of the butyl based thermoplastic tapes of this invention may be more readily appreciated by reference to the following examples.

EXAMPLE 1

Butyl based tape compositions were prepared as shown below. Composition D is a typical soft butyl tape where as composition C is the thermoplastic tape of this invention. The cone penetration of these two tapes was determined as a function of temperature.

| Soft Butyl Tape (Composition D) | | Butyl Based Thermoplastic Tape (Composition C) | |
|---|---|---|---|
| Enjay Butyl HT 10-66 | 100 | Enjay Butyl 035 | 100 |
| Vistanex LM-MS | 30 | Indopol H-1900 | 30 |
| Indopol H-1900 | 50 | FEF Black | 25 |
| FEF Black | 30 | Hi-Sil 233 | 35 |
| Atomite Whiting | 50 | Atomite Whiting | 70 |
| Flexon 845⁽¹⁾ | 40 | Zinc Oxide | 15 |
| Aroclor 1254⁽²⁾ | 10 | Amberol ST 137X | 10 |
| DETU⁽³⁾ | 1.0 | Durez 12686 | 25 |
| | | Schenectady SP-553 | 15 |

(1) An ASTM type 4 rubber process oil having a specific gravity of 865 and an SSU viscosity of 43.4 at 210° F.

(2) A chlorinated polyphenyl having a viscosity of 1800-2500 SUS at 100° F. (Monsanto Chemical Company).

(3) Diethyl thiourea (Pennsalt Chemical Company)

The results of these tests are shown in the drawing. The soft butyl tape (D) is soft over a broad temperature range and does not even approach the hardness or rigidity of, for example, a cured, rigid sealant. By comparison, the thermoplastic tape of this invention (C) is relatively hard and rigid up to about 150° F. after which the thermoplastic tape softens rapidly. At about 190° F., the thermoplastic tape has a cone penetration of about 83 and is readily workable. This is comparable in softness to a conventional, soft butyl tape at room temperature and thus is easily installed. At room temperature, i.e. 72° F., thermoplastic tape has a cone penetration of about 36 as compared to a cone penetration of about 82 for the soft butyl tape, indicating that it is harder or more rigid under conventional use conditions. These data readily show the advantages of a thermoplastic tape. It can be seen from the curves that the thermoplastic tape is fairly rigid and firm up to a temperature of about 150° F., approaching the rigidity of a cured, multicomponent gunnable sealant. However, it still has the advantages of controlled installation and complete shelf stability of the tape type sealants.

EXAMPLE 2

A butyl based thermoplastic tape was prepared using Amberol ST 137X, Durez 12686 and Schenectady SP-553 as thermoplastic resins and Indopol H-1900 as the tackifier. This composition is shown below.

| Ingredient | Parts by Weight |
|---|---|
| Enjay Butyl 065⁽¹⁾ | 100 |
| FEF Black | 25 |
| HiSil 233 | 35 |
| Zinc Oxide | 15 |
| Atomite Whiting | 70 |
| Indopol H-1900⁽²⁾ | 30 |
| Amberol ST 137X | 10 |
| Durez 12686 | 25 |
| Schenectady SP-553 | 15 |

(1) An isobutylene-isoprene copolymer having 0.8 mole % unsaturation and a Mooney viscosity at 212° F. of 45.

(2) A high molecular weight polybutene (Amoco Chemical).

TABLE I

| Tape Properties | Cured Gunnable Sealant | Butyl Thermoplastic Tape | Soft Butyl Tape |
|---|---|---|---|
| Shear Modulus, psi | | | |
| at 0°F. | 100 | 73 | 35 |
| at 72°F. | 65 | 40 | 6 |
| at 175°F. | 67 | 16 | 4 |
| Button Adhesion, psi | | | |
| at 0°F. | 450 | 315 | 49 |
| at 72°F. | 140 | 136 | 16 |
| at 175°F. | 150 | 31 | 12 |
| Cone Penetration, 1/10 mm | | | |
| at 0°F. | 7 | 3 | 28 |
| at 72°F. | 15 | 36 | 82 |
| at 175°F. | 20 | 64 | 180 |
| at 190°F. | 26 | 83 | 210 |
| Hot flow, hours at 140°F. | not run | 168+ | 1 ½ |

As is seen in Table I soft butyl tape has a cone penetration at 72° F. of 82 whereas thermoplastic butyl tape has a cone penetration of 36, indicating greater hardness or rigidity. At 190° F., the cone penetration of the thermoplastic tape is 83 which is comparable to the soft butyl tape hardness at 72° F. Since the gunnable sealant which has been cured has a cone penetration of 15 at 72° F., it can be seen that the rigidity of the thermoplastic tape approaches that of this cured sealant at low temperatures, but is as workable as soft butyl tape at elevated temperatures. The hot flow tests, run at 140° F. demonstrate that the thermoplastic tape can withstand temperatures of 140° for extended periods without any appreciable effect, indicating that even though the tape is thermoplastic it still forms a functional seal at the extremes of end use temperatures. The hot flow test consisted of suspending a ½ lb. weight from a test panel which was adhered to a rigidly held panel by two 4-inch lengths of tape. The time which the tape could support this load at 140° F. was observed.

EXAMPLE 3

A thermoplastic tape using an EPDM as the thermoplastic material was prepared and the formulation is shown below.

| Ingredients | Parts by Weight |
|---|---|
| Enjay Chlorobutyl HT-1066[1] | 100 |
| Enjay Vistalon 4504 | 75 |
| Enjay Vistanex LMMS | 50 |
| Enjay Butyl 268[2] | 5 |
| Indopol H-100[3] | 20 |
| FEF Black | 15 |
| Laminar CaCO$_3$ | 160 |
| Asbestos Shorts | 25 |
| Enjay Vistalon 404* | 2 |
| Zinc Oxide* | 5 |
| NA-22*[4] | 2 |
| Permalux*[5] | 1 |

*Curing ingredients were predispersed in Vistalon 404 designated "Poly-dispersion EZNPD 80", a complete chlorobutyl cure system available from Wyrough and Loser, Trenton, New Jersey.

(1) A chlorinated butyl rubber having about 1.5 mole % unsaturation, a chlorine content of 1.1 to 1.3 wt. % and a viscosity average molecular weight of about 350,000.

(2) A butyl rubber having a Mooney viscosity at 260°F. of 55(ML), an unsaturation of 1.5 mole % and a viscosity average molecular weight of 450,000.

(3) A polybutene having a Mechrolab Osmometer molecular weight of 889, a viscosity of 35,944/SSU at 100°F. and a viscosity of 1080 SSU at 210°F.

(4) 2-mercaptoimidazoline (E.I. duPont)

(5) Di-ortho-tolyl guanidine salt of dicatechol borate (E.I. duPont)

TABLE II

| Tape Properties | Cured Gunnable Sealant | Thermoplastic Tape Using Vistalon | Soft Butyl Tape |
|---|---|---|---|
| Shear Modulus, psi | | | |
| at 0°F. | 100 | not run | 35 |
| at 72°F. | 65 | 30 | 6 |
| at 175°F. | 67 | 12 | 4 |
| Cone penetration, 1/10 mm | | | |
| at 0°F. | 7 | 8 | 28 |
| at 72°F. | 15 | 41 | 82 |
| at 175°F. | 20 | 75 | 180 |
| at 190°F. | 26 | 90 | 210 |
| Hot Flow, hours at 140°F. | Not run | 168+ | 1½ |

As shown in Table II, this thermoplastic tape has properties similar to the butyl based-resin composition of Example 2. The cone penetration is 41 at 72° F. as compared to 82 for the soft butyl, again indicating hardness or rigidity. At 190° F., the penetration is comparable to that of a soft butyl tape at 72° F. It is readily apparent from this example that EPDM may be used in place of the resins as the thermoplastic material of this composition.

EXAMPLE 4

Several thermoplastic tape compositions were prepared using chlorobutyl rubber as the base component. One composition is shown as Compound A below; the second composition (Compound B) is identical except that the chlorobutyl is cured during the mixing step. These two compositions are compared in Table III.

| Ingredients | A | B |
|---|---|---|
| Enjay Chlorobutyl HT-1066 | 100 | 100 |
| Enjay Butyl 268 | 5 | 5 |
| Indopol H-100 | 20 | 20 |
| FEF Black | 25 | 25 |
| Atomite Whiting | 100 | 100 |
| Amberol ST 137X | 100 | 100 |
| Zinc Oxide | - | 5 |
| Zinc Chloride | - | 1 |
| Catechol[1] | - | 1 |

(1) Ortho-dihydroxybenzene.

TABLE III

| Tape properties | Cured gunnable sealant | Chlorobutyl thermoplastic tape A | Chlorobutyl thermoplastic tape B | Soft butyl tape |
|---|---|---|---|---|
| Shear modulus, p.s.i. at: | | | | |
| 0° F. | 100 | (¹) | (¹) | 35 |
| 72° F. | 65 | 35 | 33 | 6 |
| 175° F. | 67 | 10 | 12 | 4 |
| Cone penetration, 1/10 mm. at: | | | | |
| 0° F. | 7 | 3 | 2 | 28 |
| 72° F. | 15 | 25 | 27 | 82 |
| 175° F. | 20 | 112 | 82 | 180 |
| 190° F. | 26 | 140 | 98 | 210 |
| Hot flow, hours at 140° F. | (¹) | 1½ | 168+ | 1½ |

¹ Not run.

The results shown for chlorobutyl thermoplastic tape B are for the composition in the cured state. A comparison of compositions A and B clearly shows that they are harder and more rigid than soft butyl tapes. Furthermore, it is seen that despite the fact that the chlorobutyl rubber has been cured, the overall composition is still thermoplastic in nature and while the material has a cone penetration of 27 at 72° F., it has a cone penetration of 98 at 190° F. The improved hot flow resistance of compound B as compared to that of compound A demonstrates the advantage of partially curing the elastomer base of these thermoplastic compositions. Curing the chlorobutyl imparted hot flow resistance, but did not greatly detract from the thermoplasticity of the compound.

EXAMPLE 5

It has surprisingly been found that a thermoplastic tape may be prepared based on EPDM or EPM rather than butyl rubber. The EPDMs and EPMs suitable for use are those described as suitable for use as thermoplastic materials, supra. Various EPDM and EPM compositions are shown in Table IV with test data shown in Table V. A tackifier is an essential component of these compositions.

TABLE IV

EPDM AND EPM THERMOPLASTIC TAPE

| Compound: | A | B | C | D | E |
|---|---|---|---|---|---|
| Vistalon 404 (EPM) | 100 | - | - | - | - |
| Vistalon 4504 (EPDM) | - | 100 | - | - | - |
| Vistalon 3708 (EPDM) | - | - | 100 | - | - |
| Vistalon 909X (EPM) | - | - | - | 100 | 50 |
| Butyl 035 | - | - | - | - | 50 |
| FEF Black | 30 | 30 | 30 | 30 | 30 |
| Atomite Whiting | 50 | 50 | 50 | 50 | 50 |
| Hi-Sil 233 | 25 | 25 | 25 | 25 | - |
| Enjay Butyl 268 | 5 | 5 | 5 | 5 | - |
| Indopol H-100 | 20 | 20 | 20 | 20 | - |
| SP 567[1] | - | - | - | - | 25 |
| Indopol L-10[2] | 25 | 25 | 25 | 25 | - |

(1) Terpene-phenolic resin (Schenectady Chemical Co.), having a Ball & Ring melting point of 100° C. and a specific gravity of 1.0.

(2) A polybutene oil (Amoco Chemical Co.)

TABLE V

|  | A | B | C | D | E | Cured poly-sulfide | Butyl thermoplastic tape (6E02-12-8) |
|---|---|---|---|---|---|---|---|
| Cone penetration (in 1/10 mm., 300-gram load, 5 seconds) at: | | | | | | | |
| −20° F | 8 | 5 | 3 | 1 | | | |
| 20° F | 14 | 11 | 5 | 3 | 4 | | |
| 70° F | 23 | 32 | 10 | 6 | 9 | 15 | 36 |
| 140° F | 42 | 63 | 37 | 32 | 16 | | |
| 175° F | 50 | 68 | 44 | 45 | 24 | 20 | 64 |
| 190° F | 58 | 78 | 47 | 56 | 52 | 26 | 83 |
| Heat stability index (70° F./175° F.; highest value most stable) | .46 | .47 | .23 | .13 | .38 | .75 | .56 |
| Thermoplasticity index (19° F./70° F.; highest value most thermoplastic) | 2.5 | 2.4 | 4.7 | 9.3 | 5.8 | 1.7 | 2.3 |
| High temperature melt index (190° F./175° F.; highest value most desirable) | 1.2 | 1.1 | 1.1 | 1.2 | 2.2 | 1.3 | 1.3 |

Compounds A and B demonstrate that thermoplastic tapes based on EPM or EPDM can be made which will have thermoplastic properties comparable to the butyl based thermoplastic tape. Compounds C and D show that even greater thermoplasticity can be obtained by using more crystalline EPDM or EPM.

Compound E is a composition based on 50 parts of butyl rubber and 50 parts of an EPM. The resulting compound gives a highly desirable thermoplastic tape having high rigidity as shown by a cone penetration of 9 at 70° F. and yet maintaining this rigidity up to 175° F. Above 175° F., this compound exhibits much sharper softening than other types. Its softening curve very nearly approximates that of the ideal tape (Curve B, the drawing).

The compositions of this invention are most advantageously used in the form of tapes. Any convenient method of heating the tape may be used. For example, the tape may be preheated in an oven, heated in place by radiant heating or heated in place by means of a resistance wire imbedded in the tape composition. Such resistance wire heating techniques are well known to the art; see for example, Belgian Pat. No. 661,315.

Preferably, the tape is heated to about 140 to about 250° F.; more preferably, about 160 to about 220° F.; most preferably, about 175 to about 195° F. Heating time will depend on the manner of heating selected.

In the sealing of window glass of buildings or automobiles, in particular auto windshields, the tape may be preheated and placed around the periphery of the window frame or first installed into the frame and heated in place. The glass is then pressed into place against the softened tape composition thereby forming a seal. Upon cooling, the tape sealant becomes hardened and contributes to the overall strength of the structure.

It is readily evident to one skilled in the art that many modifications of this invention are possible. Hence, the scope and spirit thereof is not intended to be limited by the specific embodiments disclosed herein.

What is claimed is:

1. A process for sealing window glass which comprises:
  a. preparing a thermoplastic sealing composition having a cone penetration at room temperature of about 10 to about 60 and a cone penetration at 175° F. of about 55 to about 110, comprising
    1. a rubber, wherein said rubber is butyl rubber or halogenated butyl rubber,
    2. about 25 to about 150 parts per hundred, based on said rubber, of at least one thermoplastic material having a ring and ball softening point of at least 100° F., and
    3. a tackifier;
  b. preparing a tape of said sealing composition;
  c. inserting said tape composition peripherally in a window frame;
  d. heating said composition to a temperature of about 140° F. to about 250° F., thereby softening said tape composition; and
  e. pressing the window glass into place.

2. The process of claim 1 wherein said thermoplastic material is thermoplastic unreactive phenol-formaldehyde resin, modified wood rosin, polyterpene resin, terpene-phenolic resin, or mixtures thereof.

3. The process of claim 1 wherein the thermoplastic material is an EPDM or an EPM.

4. The process of claim 1 wherein said tackifier is selected from the group consisting of thermoplastic non-reactive phenol-formaldehyde resin, pentaerythritol ester of hydrogenated wood rosin, polyterpene resin, polyisobutylene, polybutene, chlorinated polyphenyls and mixtures thereof.

5. The process of claim 1 wherein a curative for the rubber is included in the thermoplastic sealing composition and the composition is cured prior to preparing the tape.

6. The process of claim 1 wherein an inert filler is incorporated in the composition.

7. The process of claim 6 wherein the inert filler is carbon black, hydrated silica, ground calcium carbonate, natural coated oyster shell calcium carbonate, hydrated aluminum oxide, ultra-fine magnesium silicate or mixtures thereof.

8. The process of claim 1 wherein the composition is heated to about 175° F. to about 195° F.

9. The process of claim 22 wherein the composition is heated by means of a resistance wire imbedded in the composition and connected to an electric power source.

10. The process of claim 1 wherein said window glass is an automobile windshield.

11. A process for sealing window glass which comprises:
  a. preparing a thermoplastic sealing composition having a cone penetration at room temperature of about 10 to about 60 and a cone penetration at 175° F. of about 55 to about 110, comprising
    1. a rubber, wherein said rubber is butyl rubber or halogenated butyl rubber,
    2. about 25 to about 150 parts per hundred, based on said rubber, of at least one thermoplastic material, having a ring and ball softening point of at least 100° F., and
    3. a tackifier;
  b. preparing a tape of said composition;
  c. preheating said tape composition to a temperature of about 140° F. to about 250° F.;
  d. inserting said heated composition peripherally in a window frame; and
  e. pressing the window glass in place.

12. The process of claim 11 wherein the composition is heated to about 175° F. to about 195° F.

13. The process of claim 11 wherein said window glass is an automobile windshield.

14. The process of claim 11 wherein said thermoplastic material is thermoplastic unreactive phenol-formaldehyde resin, modified wood rosin, polyterpene resin, terpene-phenolic resin, or mixtures thereof.

15. The process of claim 11 wherein the thermoplastic material is an EPDM or an EPM.

16. The process of claim 11 wherein said tackifier is selected from the group consisting of thermoplastic non-reactive phenol-formaldehyde resin, pentaerythritol ester of hydrogenated wood rosin, polyterpene resin, polyisobutylene, polybutene, chlorinated polyphenyls and mixtures thereof.

17. The process of claim 11 wherein a curative for the rubber is included in the thermoplastic sealing composition and the composition is cured prior to preparing the tape.

18. The process of claim 11 wherein an inert filler is incorporated in the composition.

19. The process of claim 18 wherein the inert filler is carbon black, hydrated silica, ground calcium carbonate, natural coated oyster shell calcium carbonate, hydrated aluminum oxide, ultra-fine magnesium silicate or mixtures thereof.

20. A process for sealing window glass which comprises:
   a. preparing a thermoplastic sealing composition having a cone penetration at room temperature of about 10 to about 60 and a cone penetration at 175° F. of about 55 to about 110, comprising
      1. a polymer selected from the group consisting of EPDM and EPM, and
      2. a tackifier resin;
   b. preparing a tape of said composition;
   c. inserting said tape peripherally in a window frame;
   d. heating said composition to a temperature of about 140° F. to about 250° F., thereby softening said tape composition; and
   e. pressing the window glass into place.

21. The process of claim 20 wherein the tackifier is selected from the group consisting of thermoplastic non-reactive phenol-formaldehyde resin, pentaerythritol ester of hydrogenated wood rosin, polyterpene resin, polyisobutylene, polybutene, chlorinated polyphenyls and mixtures thereof.

22. The process of claim 20 wherein an inert filler is included in the composition.

23. The process of claim 22 wherein the inert filler is carbon black, hydrated silica, ground calcium carbonate, natural coated oyster shell calcium carbonate, hydrated aluminum oxide, ultra-fine magnesium silicate or mixtures thereof.

24. The process of claim 20 wherein the composition is heated to about 175° F. to about 195° F.

25. The process of claim 20 wherein the composition is heated by means of a resistance wire imbedded in the composition and connected to an electric power source.

26. The process of claim 20 wherein said window glass is an automobile windshield.

27. A process for sealing window glass which comprises:
   a. preparing a thermoplastic sealing composition having a cone penetration at room temperature of about 10 to about 60 and a cone penetration at 175° F. of about 55 to about 110, comprising
      1. a polymer selected from the group consisting of EPDM and EPM, and
      2. a tackifier resin;
   b. preparing a tape of said composition;
   c. preheating said tape to a temperature of about 140° F. to about 250° F.;
   d. inserting said heated tape composition peripherally in a window frame; and
   e. pressing the window glass in place.

28. The process of claim 27 wherein the composition is heated to about 175° F. to about 195° F.

29. The process of claim 27 wherein said window glass is an automobile windshield.

30. The process of claim 27 wherein the tackifier is selected from the group consisting of thermoplastic non-reactive phenol-formaldehyde resin, pentaerythritol ester of hydrogenated wood rosin, polyterpene resin, polyisobutylene, polybutene, chlorinated polyphenyls and mixtures thereof.

31. The process of claim 27 wherein an inert filler is included in the composition.

32. The process of claim 31 wherein the inert filler is carbon black, hydrated silica, ground calcium carbonate, natural coated oyster shell calcium carbonate, hydrated aluminum oxide, ultra-fine magnesium silicate or mixtures thereof.

33. A process for sealing window glass which comprises:
   a. preparing a thermoplastic sealing composition having a cone penetration at room temperature of about 10 to about 60 and a cone penetration at 175° F. of about 55 to about 110, comprising
      1. a rubber, wherein said rubber is butyl rubber or halogenated butyl rubber, and
      2. about 25 to about 150 parts per hundred, based on said rubber, of at least one thermoplastic resin having a ring and ball softening point of at least 100° F.;
   b. preparing a tape of said composition;
   c. inserting said tape peripherally in window frame;
   d. heating said composition to a temperature of about 140° F. to about 250° F., thereby softening said tape composition; and
   e. pressing the window glass into place.

34. The process of claim 33 wherein said thermoplastic resin is thermoplastic unreactive phenol-formaldehyde resin, modified wood rosin, polyterpene resin, terpene-phenolic resin, or mixtures thereof.

35. The process of claim 33 wherein a curative for the rubber is included in the thermoplastic sealing composition and the composition is cured prior to preparing the tape.

36. The process of claim 33 wherein an inert filler is incorporated in the composition.

37. The process of claim 36 wherein the inert filler is carbon black, hydrated silica, ground calcium carbonate, natural coated oyster shell calcium carbonate, hydrated aluminum oxide, ultra-fine magnesium silicate or mixtures thereof.

38. The process of claim 33 wherein the composition is heated to about 175° F. to about 195° F.

39. The process of claim 33 wherein the composition is heated by means of a resistance wire imbedded in the composition and connected to an electric power source.

40. The process of claim 33 wherein said window glass is an automobile windshield.

41. A process for sealing window glass which comprises:
   a. preparing a thermoplastic sealing composition having a cone penetration at room temperature of about 10 to about 60 and a cone penetration at 175° F. of about 55 to about 110, comprising
      1. a rubber, wherein said rubber is butyl rubber or halogenated butyl rubber, and
      2. about 25 to 150 parts per hundred, based on said rubber, of at least one thermoplastic resin having a ring and ball softening point of at least 100° F.;
   b. preparing a tape of said composition;
   c. preheating said tape to a temperature of about 140° F. to 250° F.;
   d. inserting said heated composition peripherally in a window frame; and
   e. pressing the window glass in place.

42. The process of claim 41 wherein the composition is heated to about 175° F. to about 195° F.

43. The process of claim 41 wherein said window glass is an automobile windshield.

44. The process of claim 41 wherein said thermoplastic resin is thermoplastic unreactive phenol-formaldehyde resin, modified wood rosin, polyterpene resin, terpene-phenolic resin, or mixtures thereof.

45. The process of claim 41 wherein a curative for the rubber is included in the thermoplastic sealing composition and the composition is cured prior to preparing the tape.

46. The process of claim 41 wherein an inert filler is incorporated in the composition.

47. The process of claim 46 wherein the inert filler is carbon black, hydrated silica, ground calcium carbonate, natural coated oyster shell calcium carbonate, hydrated aluminum oxide, ultra-fine magnesium silicate or mixtures thereof.

* * * * *